March 20, 1956 — C. R. HEIM — 2,738,570
METHOD OF MOUNTING A BEARING TO COMPENSATE
FOR MISALIGNMENT AND PREVENT
SPLITTING OF OUTER MEMBER Original Filed Sept. 11, 1950 — 2 Sheets-Sheet 1

Inventor
Charles R. Heim
By Wooster Davis Attorneys.

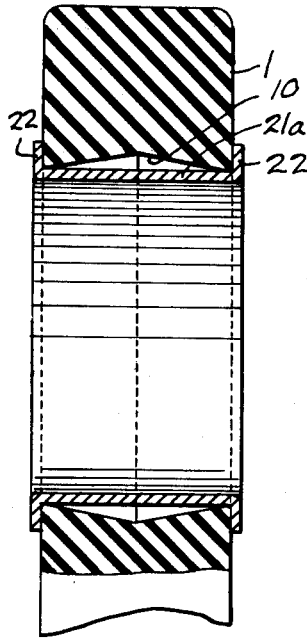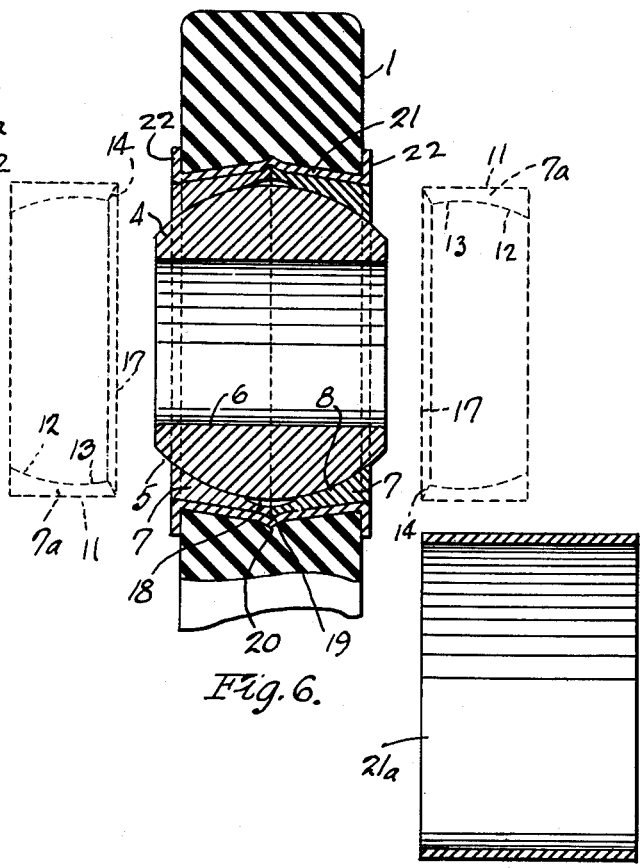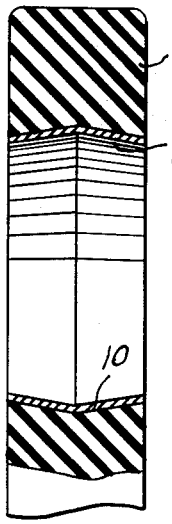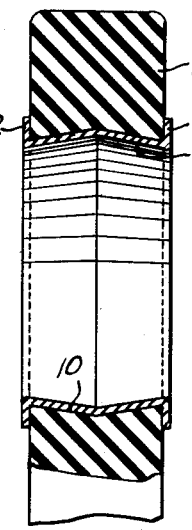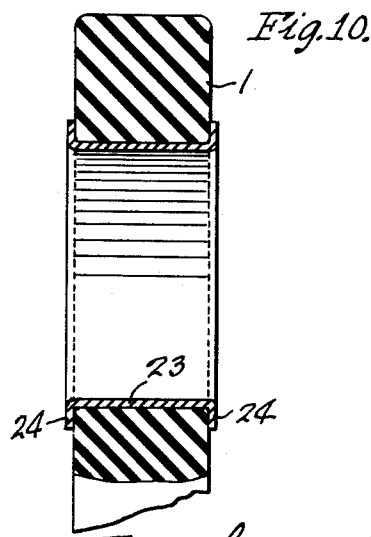

United States Patent Office 2,738,570
Patented Mar. 20, 1956

2,738,570

METHOD OF MOUNTING A BEARING TO COMPENSATE FOR MISALIGNMENT AND PREVENT SPLITTING OF OUTER MEMBER

Charles R. Heim, Fairfield, Conn., assignor to The Heim Company, Fairfield, Conn., a corporation of Connecticut Original application September 11, 1950, Serial No. 184,136. Divided and this application March 31, 1952, Serial No. 279,658

4 Claims. (Cl. 29—149.5)

This invention relates to sweepsticks for use in looms and the like, and has for an object to provide a sweepstick with a new and improved bearing which will compensate for misalignment and is also so constructed as to prevent splitting of the outer member of body of the sweepstick.

Another object is to provide a new and improved method and means of mounting such bearing in the sweepstick.

A sweepstick is used in mechanism of a loom which forces the shuttle back and forth through the shed. This operation involves a considerable shock to the mechanism which is repeated in every operation of the shuttle. It is desirable to provide this mechanism with sufficient flexibility, yielding and resiliency which will absorb much of the shock incident to the operation of the shuttle and operating mechanism to thus eliminate as far as possible breakage of the parts and reduce wear. It is also desirable to have a bearing in the sweepstick capable of compensating for misalignment without cramping or binding. A certain amount of flexibility, yielding and resiliency has been secured by making either the whole body of the sweepstick or at least a portion of it of a flexible, resilient, yielding shock-absorbing material, such, for example, as vulcanized rubber or other suitable plastic, or vulcanized rubber or other suitable plastic in which is embedded and vulcanized layers of fabric such, for example, as canvas. Or it could be made of laminated wood, fiber (cloth and rubber), laminated fabric and rubber vulcanized together, or it could be of any other suitable yielding resilient shock-absorbing material. A sweepstick of these materials not only has a certain amount of yield or resiliency longitudinally to absorb longitudinally strains or shocks, but is also capable of a certain amount of lateral bending or yielding.

It has been found in practice that with the usual type of bearing mounted in these sweepsticks there is a tendency for the repeated shocks incident to the operation of these devices, transmitted between the body and the bearing, to split the body and cause it to deteriorate and thus fail. It is therefore another and important object of this invention to provide a bearing structure which will greatly reduce the tendency of the body member of the sweepstick to split or deteriorate, and will also hold the body member from splitting.

It is a further object to mount in the sweepstick body comprising these materials such an improved bearing which is also capable of lateral rocking movement.

This construction effectively absorbs both longitudinal and lateral shocks and also compensates for misalignment without binding or cramping effect. This improved construction further greatly increases the life not only of the sweepstick itself, but also of the connected mechanism with which it is used, and improves operation of the device as well as greatly increasing its operative life and efficiency.

The application is a division of my prior application Serial No. 184,136, filed September 11, 1950.

With the foregoing and other objects in view, I have devised the construction illustrated in the accompanying drawings forming a part of this specification, and the novel method of making it. It is, however, to be understood the invention is not limited to the specific details of construction and arrangement shown, but may embody various changes and modifications within the scope of the invention.

In these drawings:

Fig. 5 is a vertical section showing a modified form of bushing for the bearing mounted therein;

Fig. 6 is a similar section showing the bearing mounted in the type of bushing of Fig. 5;

Figs. 7, 8 and 9 are sections through one end of the sweepstick showing different forms of bushings which may be used with the bearings of Figs. 2 and 6, but with these bearings omitted, and Fig. 10 is a section of a bushing which may be used in these bearings.

Figures 1, 2, 3, 4:
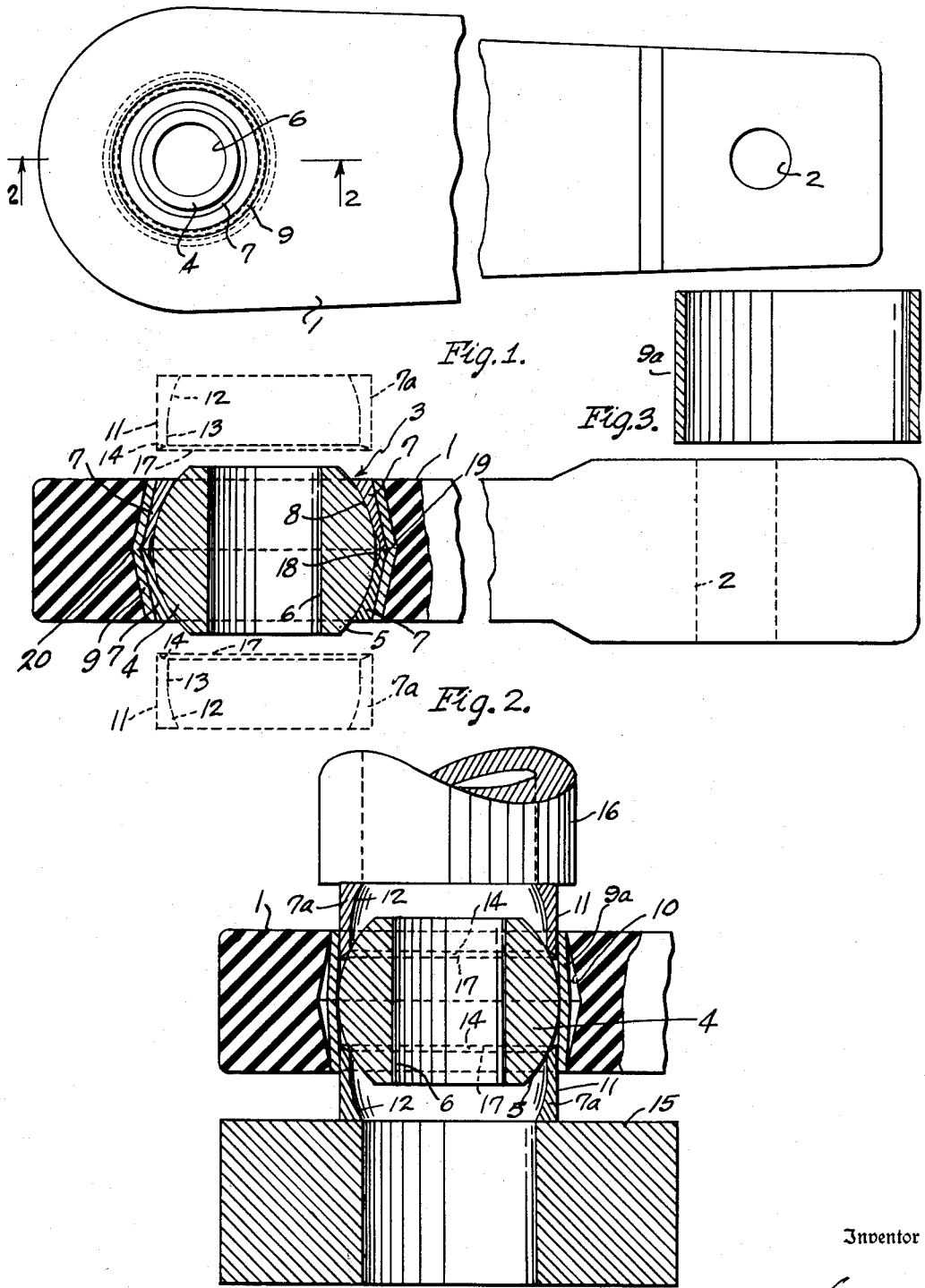
Fig. 1 is a side elevation of one form of my improved sweepstick.
Fig. 2 is a partial longitudinal section substantially on line 2—2 of Fig. 1 and a partial side elevation, both on a somewhat enlarged scale.
Fig. 3 is a section of a bushing used in the bearing.
Fig. 4 is a vertical section and partial elevation illustrating somewhat diagrammatically an improved method of mounting the bearing in the sweepstick body.

Referring first to Figs. 1 to 4 inclusive, the sweepstick comprises a body 1 of any suitable cross section, preferably in the form of a substantially rectangular bar as shown, formed of some suitable yielding, resilient, shock-absorbing material, such, for example, as vulcanized rubber or other plastic which is sufficiently hard and rigid to retain its shape and still have a certain amount of yield, resiliency and flexibility to absorb shocks in operation but will transmit the necessary force required for this operation. It may be a solid bar of this vulcanized rubber or other plastic, or it could contain a strengthening fabric (not shown) with any suitable number of layers embedded in and vulcanized in the rubber, or it could be made of laminated wood, fiber (cloth and rubber), laminated fabric and rubber vulcanized together, or it could be of any other suitable yielding, resilient, shock-absorbing material. At one end it may have any suitable bearing 2 for connection to the mechanism with which it is used, this bearing in the drawing being merely shown diagrammatically as a transverse opening through the body.

At the opposite end it is provided with an improved bearing 3 including an element 4 capable of laterally rocking movement to compensate for misalignment in the parts connected by this sweepstick. This member 4 is preferably a hardened steel member, the outer surface 5 of which is spherical and through which is a cylindrical bearing opening 6. This member is mounted in two supporting bearing rings or inserts 7 of any suitable material, but preferably bronze, having inner spherical surfaces 8 corresponding with the outer spherical surface of the member 4. The transverse straight bearing 6 is for connection with the operating mechanism. The rings or inserts 7 are mounted in an enclosing bushing 9, preferably of steel but it could be of other suitable material, mounted directly in the material of the body 1. In the form shown in Fig. 2, this bushing is of increasing diameter from each of its opposite ends to substantially the center and is therefore tapered in opposite directions from this center, and is mounted in a similarly shaped opening 10 in the outer or body member 1 so that this bushing is thus locked in this supporting or body member. The bushing may be of any desired thickness. It is shown somewhat exaggerated in the drawings for clearness.

An improved and preferred method of assembling and mounting this bearing is shown in Fig. 4. First the oppositely tapered opening 10 is formed in the body member 1 in any suitable manner, such, for example, as molding it in this member if the body is a molded member, or cutting it after the body is formed. Then there is inserted in this opening the straight bushing 9a and the accurately finished spherically shaped bearing member 4 placed in the bushing and centered therein by any suitable means (not shown). Then the two rings or inserts 7a are placed on opposite sides of this member and the body 1, as shown in Fig. 4, these members being of substantially the shape shown in this figure and in dotted lines Fig. 2. That is, they have straight or cylindrical outer side walls 11, a substantially spherical portion 12 substantially corresponding to spherical surface 5 of member 4 leading inwardly from its outer end running into a substantially cylindrical portion 13, and the inner end or edge of the ring being tapered or beveled as indicated at 14. The outer diameter of the ring 7a is substantially the same as the internal diameter of the sleeve 9a, and when the two rings or inserts 7a are inserted in the bushing, as indicated in Fig. 4, the inner edges of the bevel 14 contact the outer spherical surface 5 of the member 4 somewhere between the outer ends and the central line of the spherical surface 5. Then by forcing the two rings or inserts 7a inwardly toward each other, for example, by supporting one on a die-block 15 and pressing downwardly with a plunger 16, the two rings are forced inwardly, and by co-action of the outer spherical surface 5 of the member 4 their inner ends are expanded as they follow around the spherical surface to the positions shown in Fig. 2, the spherical portion 12 eventually seating on the spherical surface 5. As the outer edges 17 of the two beveled ends or edges 14 come together they force each other outwardly and carry the inner end portions of these rings outwardly away from the surface 5, as indicated at 18 Fig. 2, to form a channel about the midsection of the member 4. As the inner end portions of these inserts follow around the spherical surface 5 of the inner member 4 they are expanded outwardly and therefore also expand the bushing 9a to the outwardly oppositely tapered form of Fig. 2 and press the outer surfaces of the bushing tightly against the surfaces of the opening 10 in the body member and may even compress the material immediately around the opening to more tightly clamp and hold the bushing. As the inner edges of the rings come together they are deflected and expanded outwardly and they may form a slight groove 19 on the inner surface of the bushing and a corresponding ridge 20 on the outer surface, to still further lock the bushing in the material of the body 1. The bevels 14 at the inner ends of the inserts are preferably such that when in this position they squarely seat against each other as shown in Fig. 2. The groove 18 is formed as a peripheral groove for oil or suitable lubricant, and may form a reservoir for a lubricant, and if desired an oil passage (not shown) may be formed in the member 1 and members 9 and 7 leading to this groove. As the insert members are forced against the spherical member and expand, they closely grip this member. They are then loosened somewhat to permit free turning or lateral rocking movement of the spherical member.

It will be evident from Fig. 2 that the opposite tapers of the outer wall of the bushing 9 and the similarly tapered walls in the opening of the body 1 securely lock the bushing in the body member, the outer wall surface of the bushing being pressed tightly against the surface of the opening. The tapers on the inner sides of the bushing 9 also securely lock and mount the bearing inserts 7 in the bushing and maintain the various parts of the bushing in proper relative position. It will also be evident that the bushing 9 takes all the shock loads and blows from the bearing incident to operation of the device in the mechanism in which it is installed and distributes or spreads the forces and strains of these blows uniformly over the surfaces of the opening in the body or supporting member 1 and therefore reduces to a minimum the tendency of these shocks or blows to split the body member 1 or to cause the material at the outer side of the bushing to deteriorate or fail from the action of these forces. The inner bearing member 14 is mounted with a good bearing fit in the inserts or mounting bearing members 7 and has universal turning movement in these members. It therefore may rock laterally to compensate for misalignment in the mechanism with which the sweepstick is installed.

Modified forms of the outer sleeve or bushing 9 are shown in Figs. 5 to 10, the bearing member 9 and the mounting inserts 7 being the same in all cases. In the form of Figs. 5 and 6 the bushing 21 corresponding to the bushing 9 has the same shape and is mounted in the same way within the body member 1, the only difference being that this bushing in the form of a sleeve 21a when inserted in the opening 10 in the body member 1, is somewhat longer than the thickness of the body member, and after insertion in the body member its opposite ends are rolled over against the outer side surfaces of the member 1 to form the flanges 22 closely embracing the side surfaces. Or these flanges could be embedded in the material of the body 1 so as to be flush or semi-flush with the outer surfaces of the body member. These flanges serve as still further means for locking the bushing and bearing in the body member 1, and they also form additional means for preventing the material of the body member from splitting or spreading laterally.

Various forms of the bushing are shown in Figs. 7, 8 and 9 with the bearing omitted. In Fig. 7 the bushing is the same as that of Fig. 2, in Fig. 8 the same as that of Fig. 6, and Fig. 9 shows a further modification except that the body portion of the bushing 23, instead of being tapered, is substantially straight or cylindrical, but it is rolled or turned over at its opposite ends to provide flanges 24 closely embracing the outer surfaces of the body member 1 to lock this bushing in the body member and also hold the body member against splitting.

It will be clear from the above that with this improved bearing and mounting the forces of the shocks or blows, or shock loads, incident to operation of the device are transmitted from the bearing through the outer bushing and are equally distributed by this bushing to and over the surface of the opening in the body member, and that therefore the tendency to split the body member or cause deterioration of the material of this member around the bearing and thus failure of the bearing and the body member is reduced to a minimum, that splitting or spreading of the body member is still further prevented by the out-turned flanges of the bushing in the forms of Figs. 5, 6, 8 and 9, and that in all forms the bearing is firmly locked in proper position in the body member and retained in this position.

Having thus set forth the nature of my invention, I claim:

1. A method of making a connecting bar of the character described which comprises forming said bar of yieldable, resilient shock-absorbing material, forming a transverse opening in the bar adjacent one end, mounting a relatively thin substantially straight metal bushing in said opening, placing a spherical metal bearing member in the bushing, and pressing against said member from the opposite sides thereof a pair of metal insert rings of smaller internal daimeter than the spherical member so that as they are pressed against said member they are expanded to tightly fit the member and the bushing to mount said member in the bushing for lateral rocking movements, the inner ends of said rings being expanded to a greater diameter than the bushing to also expand the central portion of the bushing so that it tapers inwardly in opposite directions from said center to interlock it with the material of the bar.

2. A method of making a connecting bar of the character described which comprises forming said bar of yieldable, resilient, shock-absorbing material, forming a transverse opening in the bar adjacent one end which is tapered inwardly from its opposite ends with a progressively increasing diameter, placing a tubular relatively thin walled metal bushing in said opening, placing a spherical metal bearing member in the bushing, and pressing against said member from the opposite sides thereof a pair of metal insert rings of smaller internal diameter than the spherical member so that as they are pressed against said member they are expanded to tightly fit the member and their inner ends are also expanded to a larger diameter than the bushing to engage the inner surface of the bushing and expand the central portion thereof to taper inwardly in opposite directions and closely fit the opening in the bar.

3. A method of making a connecting bar of the character described which comprises forming said bar of yieldable, resilient, shock-absorbing material, forming a transverse opening in the bar adjacent one end which is tapered inwardly from its opposite ends with a progressively increaing diameter, placing a tubular relatively thin metal bushing in said opening, placing a spherical metal bearing member in the bushing, and pressing against said member from the opposite sides thereof a pair of metal insert rings of smaller internal diameter than the spherical member and of substantially the same external diameter as the internal diameter of the bushing to expand said rings, and so that as the rings are pressed against the said member they are expanded to tightly fit the member and also to engage and expand the central portion of the bushing to taper inwardly in opposite directions and closely fit the opening in the bar.

4. A method of making a connecting bar of the character described which comprises forming said bar of yieldable, resilient, shock-absorbing material, forming a transverse opening in the bar adjacent one end which is tapered inwardly from its opposite ends with a progressively increasing diameter, placing a tubular relatively thin metal bushing in the opening and forming out-turned flanges at its opposite ends closely engaging the opposite sides of the bar, placing a spherical metal bearing member in the bushing, and pressing against said member from the opposite sides thereof a pair of metal insert rings of smaller internal diameter than the spherical member and of substantially the same external diameter as the internal diameter of the bushing to expand said rings, and so that as the rings are pressed against the said member they are expanded to tightly fit the member and also to engage and expand the central portion of the bushing to taper inwardly in opposite directions and closely fit the opening in the bar.

References Cited in the file of this patent

UNITED STATES PATENTS

| | | |
|---|---|---|
| 1,734,025 | Zeibig | Oct. 29, 1929 |
| 1,777,965 | Eakins | Oct. 7, 1930 |
| 2,016,923 | Herrman | Oct. 8, 1935 |
| 2,195,749 | Lignian | Apr. 2, 1940 |
| 2,366,668 | Heim | Jan. 2, 1945 |
| 2,445,745 | Moe | July 20, 1948 |
| 2,541,160 | Heim | Feb. 13, 1951 |
| 2,601,875 | Dardani | July 1, 1952 |